(12) United States Patent
Sawada et al.

(10) Patent No.: US 7,465,896 B2
(45) Date of Patent: Dec. 16, 2008

(54) ELECTRONIC DEVICE

(75) Inventors: Masaki Sawada, Osaka (JP); Hiroto Inoue, Kyoto (JP); Tamotsu Yamamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 137 days.

(21) Appl. No.: 11/451,302

(22) Filed: Jun. 13, 2006

(65) Prior Publication Data

US 2006/0278512 A1 Dec. 14, 2006

(30) Foreign Application Priority Data

Jun. 13, 2005 (JP) .............................. 2005-171987

(51) Int. Cl.
*H01H 3/00* (2006.01)

(52) U.S. Cl. ...................... 200/329; 200/314

(58) Field of Classification Search ......... 200/310–315, 200/341–345, 512–520, 329, 5 A, 5 R
See application file for complete search history.

(56) References Cited

U.S. PATENT DOCUMENTS

| | | | | |
|---|---|---|---|---|
| 3,886,012 A | * | 5/1975 | Slater | 156/73.1 |
| 4,375,585 A | * | 3/1983 | Lee | 200/5 A |
| 4,619,258 A | * | 10/1986 | Pool | 606/42 |
| 4,931,794 A | * | 6/1990 | Haag et al. | 341/31 |
| 5,598,082 A | * | 1/1997 | Gilpin et al. | 200/293.1 |
| 6,323,449 B1 | * | 11/2001 | Janniere | 200/408 |
| 6,359,242 B1 | * | 3/2002 | Maple | 200/5 A |
| 6,794,982 B2 | | 9/2004 | Inoue et al. | |
| 6,924,789 B2 | * | 8/2005 | Bick | 345/168 |
| 6,995,324 B2 | * | 2/2006 | Asada | 200/1 B |
| 7,070,349 B2 | * | 7/2006 | Dombrowski et al. | 400/490 |
| 2003/0085793 A1 | | 5/2003 | Inoue et al. | |
| 2008/0062670 A1 | * | 3/2008 | Hong | 362/26 |

FOREIGN PATENT DOCUMENTS

CN 1386286 12/2002
JP 2001-076582 A 3/2001

OTHER PUBLICATIONS

Chinese Office Action issued in Patent Application No. 2006100918589 dated on Jun. 27, 2008.

* cited by examiner

*Primary Examiner*—Michael A Friedhofer
*Assistant Examiner*—Lisa N Klaus
(74) *Attorney, Agent, or Firm*—McDermott Will & Emery LLP

(57) ABSTRACT

An electronic device includes a pad which can detect an operating coordinate position by a touch operation, and a single push-switch provided under the pad. A touch operation to the pad at a given place allows a preliminary announcement of a function, and a further press-down of the pad being kept at the same position prompts the push-switch to work and determine the function preliminary announced. This structure allows excellent operability, and a single push-switch allows reducing the number of components of the operating section, so that the electronic device having these advantages is obtainable.

13 Claims, 9 Drawing Sheets

FIG. 14   - Prior Art

FIG. 15    - Prior Art
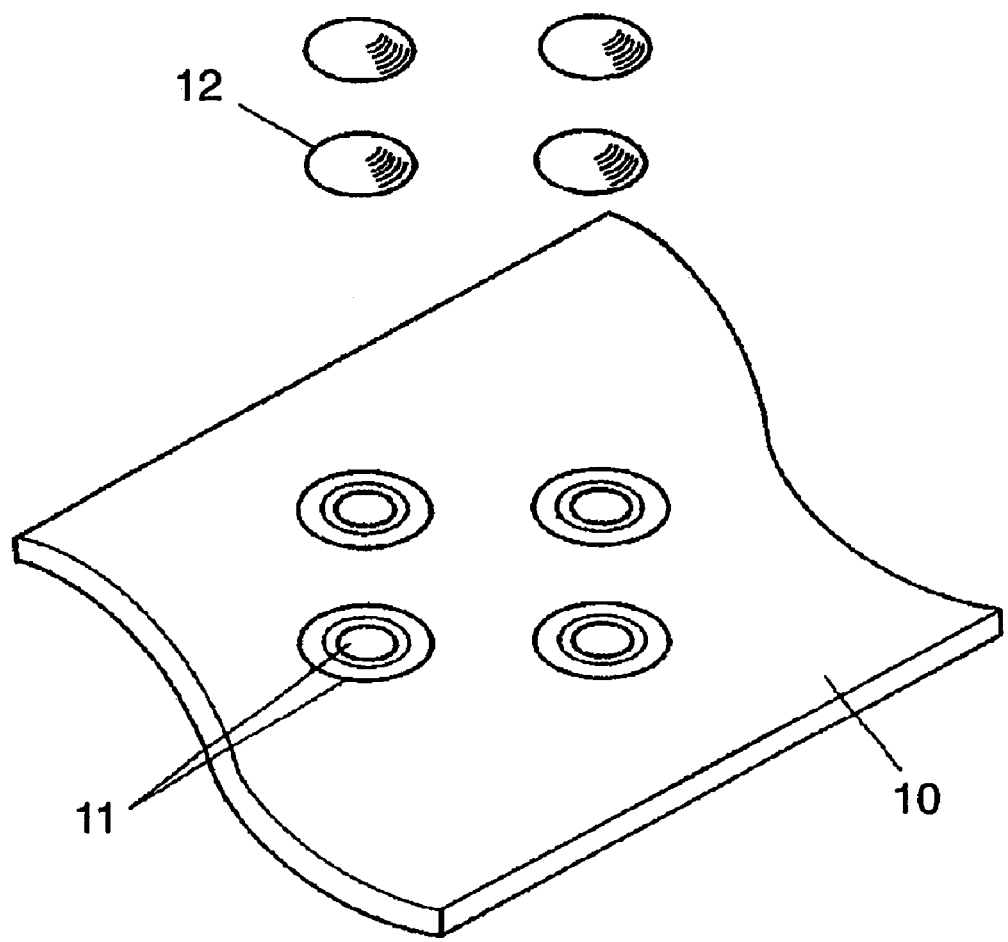

ELECTRONIC DEVICE

FIELD OF THE INVENTION

The present invention relates to electronic devices such as audio-visual devices, office automation devices, and more particularly, it relates to electronic devices which have a multi-directional operating section.

BACKGROUND OF THE INVENTION

Development of various electronic devices has been accompanied with market requirement about more excellent operability. Portable electronic devices such as cellular phones and digital still cameras have been required to be further downsized and light-weighted, and yet, an improvement in usability has been also needed.

A cellular phone taken as an example of conventional electronic devices is described hereinafter. FIG. 11 is an perspective appearance of a general cellular phone. First enclosure 1 and second enclosure 2 are hinged together and are foldable. Display 3 is placed inside first enclosure 1, and a top face of second enclosure 2 works as operator panel 2a for manipulating various functions. A controller (not shown) is placed inside second enclosure 2 for controlling operations through an input to operator panel 2a.

On operator panel 2a, operating keys are arranged such that multi-directional operating section (key) 4 and enter keys 5 are placed forward, and ten-key 6 is placed backward. Each one of the respective keys has a push switch (not shown) provided on a circuit board placed in second enclosure 2 and an operating button which prompts the push switch from the top to work.

Multi-directional key 4 is formed of four push switches assigned to front, back, left and right directions and one operating button which prompts the four push switches to work. Depressing a disk-like operating button protruding from panel 2a at its front, back, left or right position results in obtaining a switch signal corresponding to the position depressed.

Enter keys 5 are placed on both sides of multi-directional key 4 respectively. Pressing the operating buttons protruding from panel 2a results in obtaining a switch signal corresponding to the push switch placed under the operating button.

Ten-key 6 includes operating buttons arranged on three rows and four lines. Pressing each one of the operating buttons protruding from panel 2a results in obtaining a switch signal corresponding to each one of the push switches placed under the respective operating buttons.

In the conventional electronic device, signals from the respective switches are supplied to the controller placed in second enclosure 2, and the controller controls a content to be displayed on display 3 and various functions. When a user operates operator panel 2a in a given way, various information is displayed on display 3, then the user selects a desirable item or a function and enters it through enter key 5 for execution.

A displayed condition on display 3 is described hereinafter. A telephone number is taken as an example of a display on display 3. Choices such as telephone numbers to be selected are displayed in a format of one choice by one line as shown in FIG. 12, and a selected one is usually indicated with cursor 7. Only a part of the respective choices is usually displayed due to a limited area of display 3. In such a case, the user needs to read the hidden part by depressing multi-directional key 4 at its left or right position to scroll the displayed content in a lateral direction through the control by the controller. A choice of lines in a vertical direction needs to depress key 4 at its front or back position to scroll the displayed content in the vertical direction, and the controller controls the display in the vertical direction accordingly.

The user selects a line and puts cursor 7 to the selected choice, then depress enter key 5. This operation sends a switch signal corresponding to the selected item to the controller, which then confirms the selected choice, or executes a move to a menu on the lower level.

Recently, a cellular phone has been sophisticated, which is accompanied with increment of functions available to users, and yet, the usability of those functions has been improved. As a result, functions and choices to be displayed on display 3 are increasingly symbolized using an icon instead of describing them in the format of one choice by one line.

A display using icons is described with reference to FIG. 13. On display 3, pointer 8 (indicated with an arrow mark) is displayed and various icons 9 are displayed in a given arrangement.

In FIG. 13, eight icons 9 are schematically arranged equidistantly shaping like a square on display 3. To be more specific, three icons are arranged equidistantly on a upper line and a lower line respectively, and two icons are placed on a middle line except at the center position. Depressing multi-directional key 4 at its front, back, left or right position prompts pointer 8 to move to the choice selected, because a switch signal corresponding to the depressing is sent to the controller, which then moves pointer 8 accordingly.

In such an electronic device, depressing multi-directional key 4 at its front, back, left, or right position moves pointer 8 to a desirable choice, then entry key 5 is depressed. This operation prompts the controller to execute a control in response to the switch signal transmitted, thereby executing a function assigned to icon 9 selected, or executing a move to a menu on the lower level.

The foregoing prior art is disclosed in, e.g. Japanese Patent Unexamined Publication No. 2002-351598.

The progress of a slimmer and lighter body of the conventional cellular phone entails use of the switches shown in FIG. 14 or FIG. 15 as multi-directional key 4. To be more specific, a set of four fixed contacts 11 of the switch is placed on circuit board 10 in second enclosure 2, and domed movable contact 12 for on/off is mounted to the respective fixed contacts 11. This type of switch has been employed mainly in the cellular phones. The structure of the switch discussed above makes the body advantageously slim; however, use of four individual switches needs structural elements for four ones, and is resistant to a decrease in the number of components. Amid such circumstances, users of the cellular phone still need further improvement in the usability.

SUMMARY OF THE INVENTION

The present invention addresses the problems discussed above, and aims to provide electronic devices having a multi-directional operating section formed of a fewer number of components and excellent in operability. The electronic device of the present invention comprises the following elements for achieving the foregoing objectives:

a pad for detecting an operating coordinate position by touching;

a single push-switch, having moderate tactile feeling, disposed under the pad; and a controller for receiving a signal from the pad through the push-switch and recognizing the input signal as well as controlling respective functions.

A touch operation to the pad prompts the controller to recognize the position touched at the pad and to execute a first action in response to the corresponding coordinate position. The touch operation is kept and accompanied by further depressing, which turns on the push-switch, then the controller executes a second action based on the switch signal.

Since the electronic device of the present invention has an operating section with a single push-switch, the number of components can be reduced. A light touch to the operating section activates the first action, and a further depress of the operating section activates the second action, so that the electronic device excellent in operability is obtainable.

BRIEF DESCRIPTION OF THE DRAWINGS

FIG. 14 shows a sectional view illustrating a switch section of a conventional multi-directional operating section.

FIG. 15 shows an exploded perspective view illustrating the switch section of a conventional multi-directional operating section.

PREFERRED EMBODIMENT OF THE INVENTION

A cellular phone as an example of electronic devices, similar to the description of prior art, is demonstrated hereinafter with reference to the accompanying drawings. Elements similar to those used in the prior art have the same reference marks, and the descriptions thereof are omitted here.

Exemplary Embodiment

Figure 1:
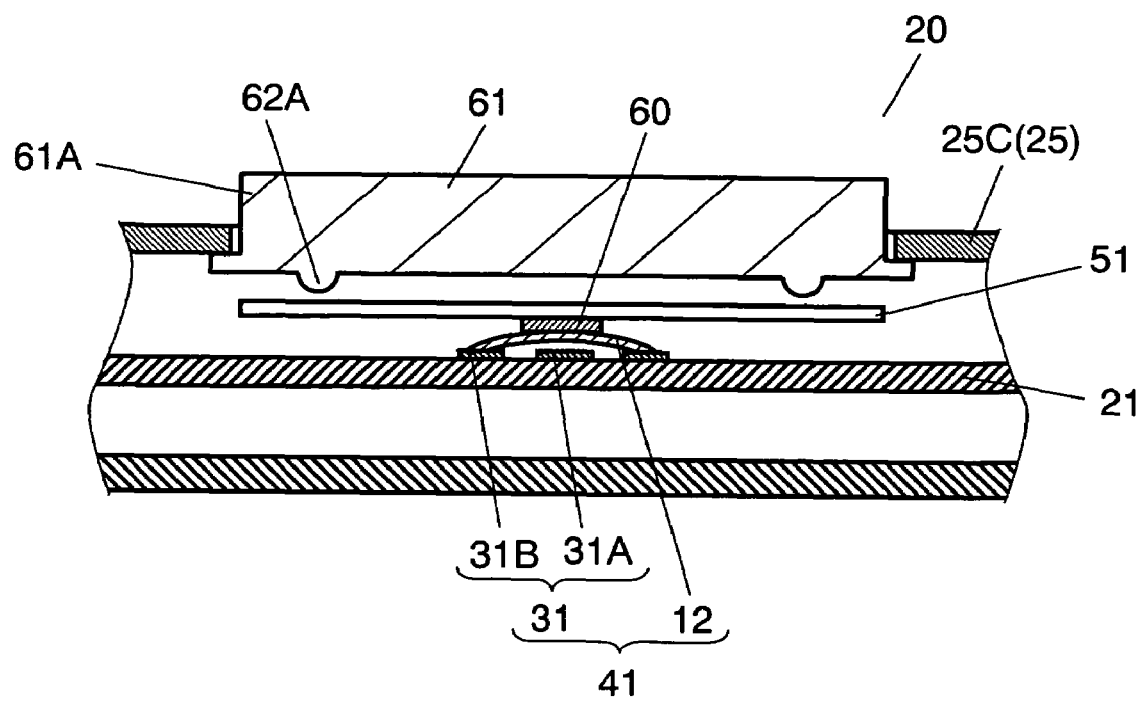
FIG. 1 shows a sectional view of a multi-directional operating section of an electronic device in accordance with an embodiment of the present invention.
Figure 2:
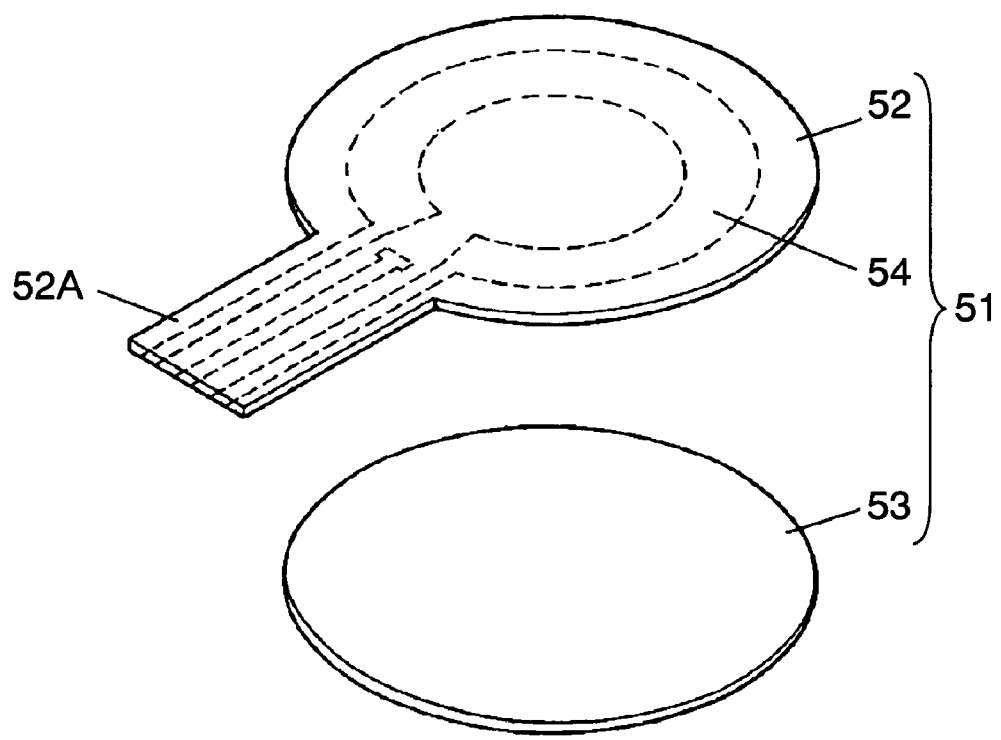
FIG. 2 shows an exploded perspective view of the multi-directional operating section in accordance with an embodiment of the present invention.
Figure 2:
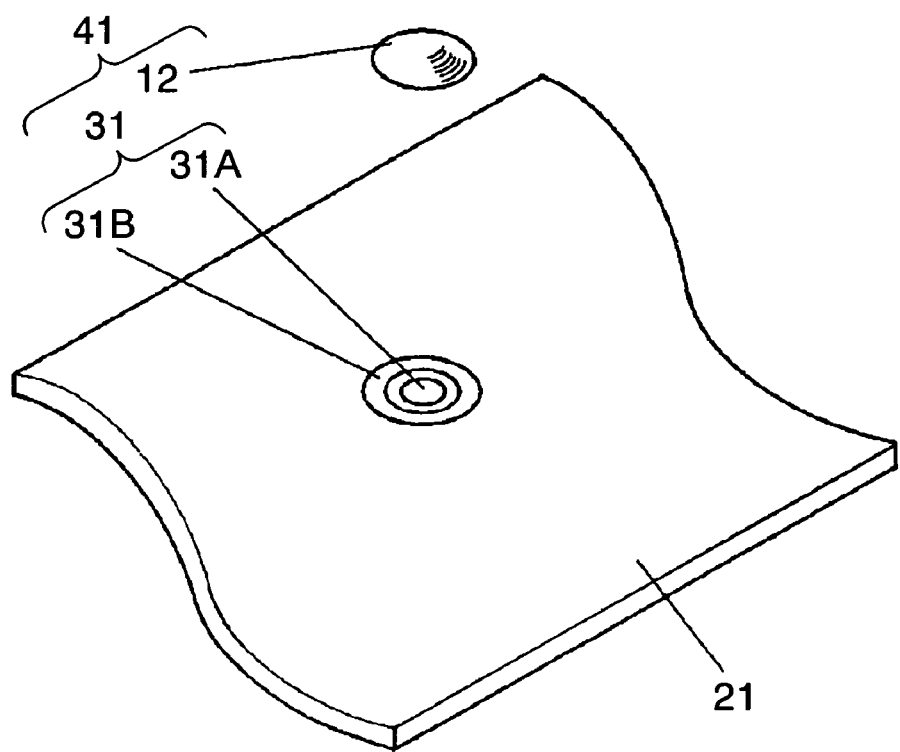
Figure 3:
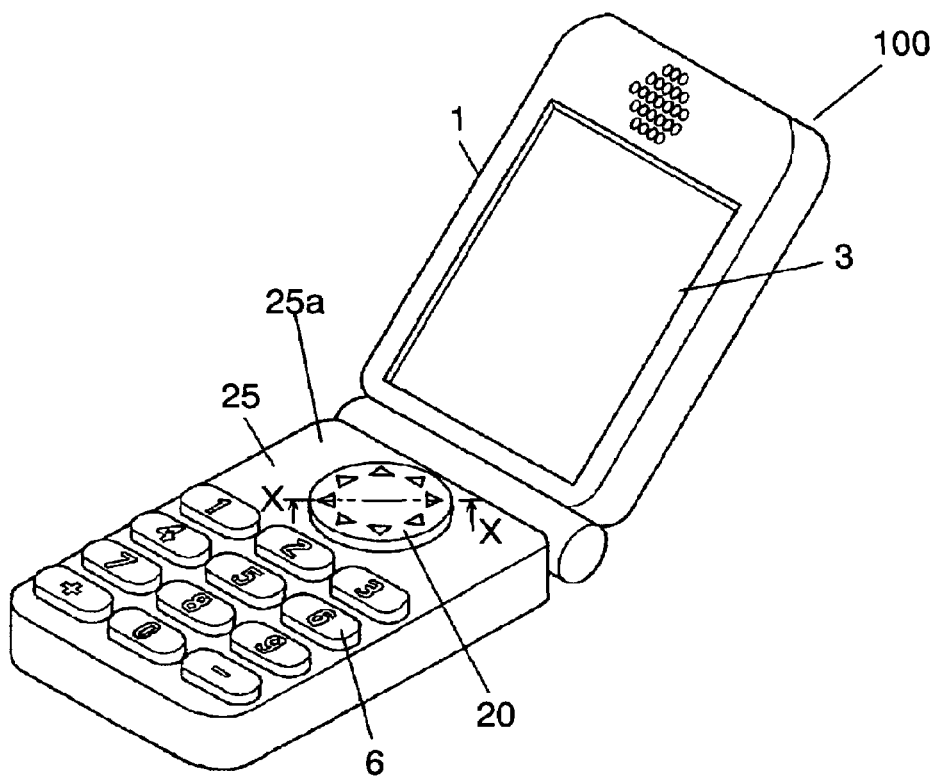
FIG. 3 shows a perspective appearance of the electronic device in accordance with an embodiment of the present invention.

FIG. 1 shows a sectional view of a multi-directional operating section of cellular phone 100 in accordance with an embodiment of the present invention. FIG. 2 shows an exploded perspective view of the multi-directional operating section shown in FIG. 1. FIG. 3 shows a perspective appearance of cellular phone 100. FIG. 1 is the sectional view cut along line X-X in FIG. 3.

As shown in FIG. 1, multi-directional operating section 20 of cellular phone 100 includes pad 51 which can detect an operating coordinate position by touching, and single push-switch 41 placed under the center of pad 51.

As shown in FIG. 3, multi-directional operating section 20 is placed at front on the top face of second enclosure 25 hinged with first enclosure 1 having display 3. Second enclosure 25 can be thus folded on first enclosure 1. The top face of second enclosure 25 is used as operator panel 25a as it is used so in the conventional cellular phone, and ten-keys 6 are placed behind multi-directional operating section 20 at a rear part of operator panel 25a. Other structures of cellular phone 100 remain unchanged from the conventional one.

Push-switch 41 comprises a pair of fixed switch contacts 31A and 31B provided on circuit board 21 in second enclosure 25, and one domed movable contact 12. Domed movable contact 12 is stuck onto circuit board 21 with adhesive tape and placed on fixed contact 31B, for turning on/off fixed contacts 31A and 31B. Fixed switch contacts 31A and 31B are collectively called fixed switch contact 31. Fixed contact 31A corresponds to center contact 31A, and fixed contact 31B corresponds to outer contact 31B.

An operation of push-switch 41 is demonstrated hereinafter. Domed movable contact 12 is depressed from the top, then the center portion of movable contact 12 moderately turns from upward to downward and an underside of the center of the dome touches center contact 31A. As a result, center contact 31A is conducting, via domed movable contact 12, to outer contact 31B on which a lower end of the circumference of movable contact 12 is placed. When the depressing force is removed from domed movable contact 12, domed movable contact 12 restores itself to its original domed shape, namely protruding upward, so that center contact 31A and outer contact 31B become electrically independent of each other again.

Pad 51 provided above push-switch 41 is electrically coupled to a given pattern (not shown) on circuit board 21, and an output signal can be taken out via this pattern. Pad 51 includes pressing protrusion 60 projecting downward on its underside at the center, and pressing protrusion 60 is provided at the center on domed movable contact 12 with the center of protrusion 60 aligned over the center of contact 12. Meanwhile, a plate-like member placed on the top face of push-switch 41 can be used as pressing protrusion 60. The outer size of the plate-like member is preferably smaller than the outer diameter of domed movable contact 12, and the plate-like member preferably shapes like a circular; however, it can shape like a polygon.

Pad 51 as a whole can be slanted, and the center of pad 51 is aligned to the center of push-switch 41. The member of pad 51 can detect four positions of second enclosure 25, namely, front, back, left and right. In addition to these four positions, the member can detect another four positions, namely, respective mid points between the foregoing four positions. The member thus can detect eight positions in total. The foregoing member is used as pad 51.

As shown in FIG. 1 and FIG. 2, pad 51 comprises upper substrate 52 and lower substrate 53 with a given space in between, and resistor element 54, which can detect a coordinate position, provided between upper and lower substrates 52 and 53. Pad 51 shown in FIG. 2 is detailed hereinafter.

Pad 51 comprises the following elements:
- disk-like lower substrate 53; and
- upper substrate 52 shaping like lower substrate 53 and having tail 52A integrally formed with substrate 52; and
- resistor element 54 confronting lower substrate 53 with a given space in between.

Lower substrate 53 is made of flat conductive metal thin plate made by stainless steel (SUS). Upper substrate 52 is made of flexible polyethylene terephthalate (PET) film. Both the substrates confront each other via an adhesive layer (not shown) and a given space in between. Resistor element 54 shaping like a horseshoe is formed on underside of upper substrate 52, and confronts lower substrate 53 with a given space in between.

Figure 4:
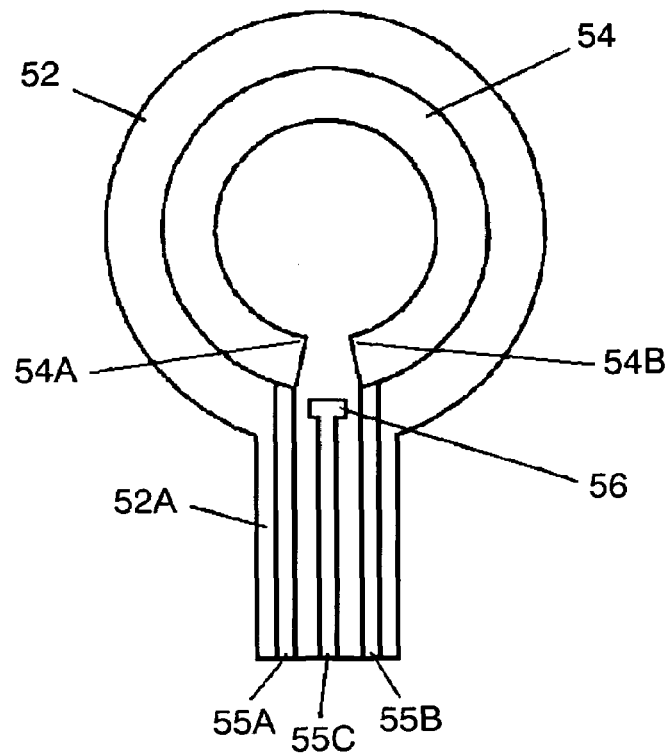
FIG. 4 shows a bottom view of an upper member of a pad used in the multi-directional operating section in accordance with an embodiment of the present invention.
Figure 5:
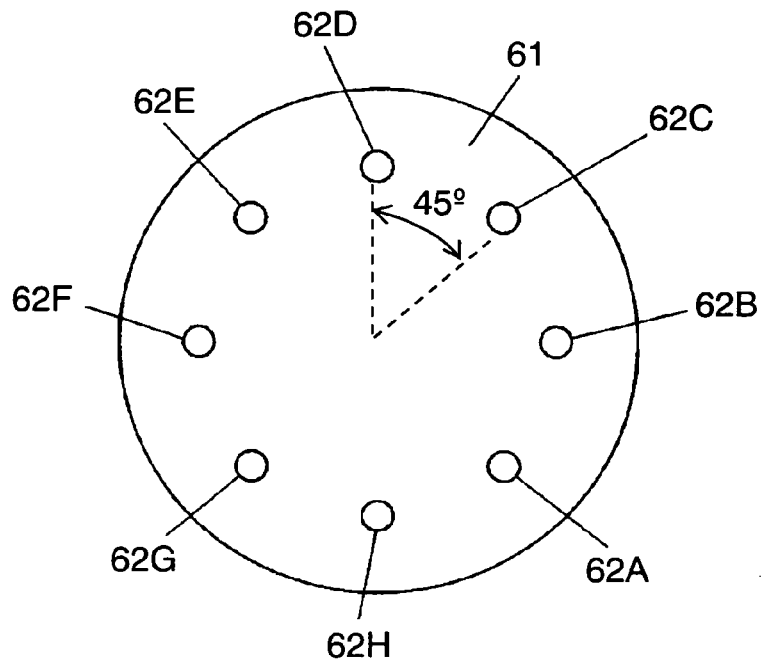
FIG. 5 shows a bottom view of an operating button of the multi-directional operating section in accordance with an embodiment of the present invention.
Figure 6:
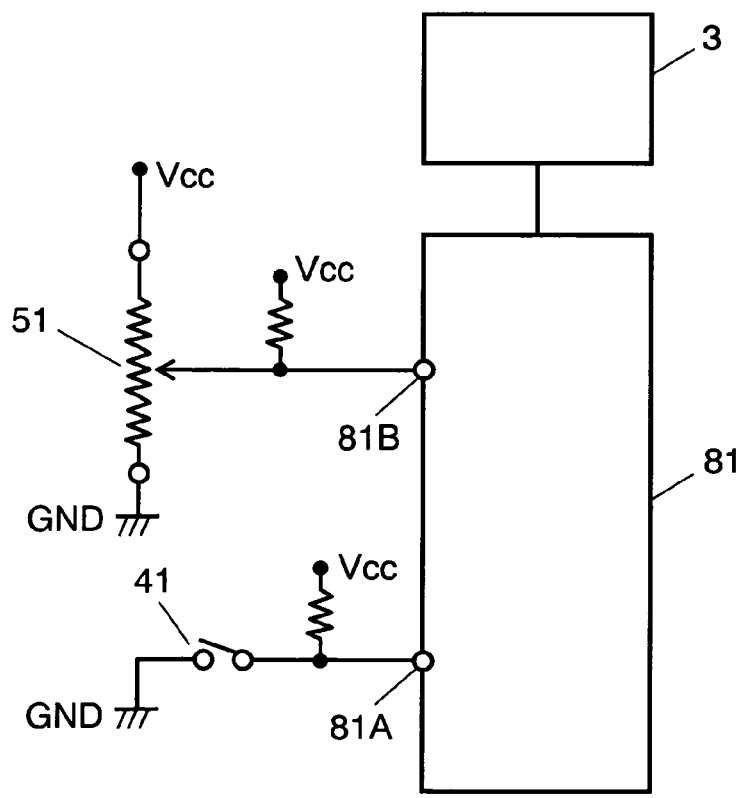
FIG. 6 shows a block diagram illustrating a connection status between the multi-directional operating section, a controller, and a display in accordance with an embodiment of the present invention.

As shown in FIG. 4, resistor element 54 has first end 54A and second end 54B at its both ends respectively. First end 54A and second end 54B are led out to the outside via first terminal 55A and second terminal 55B respectively placed on tail 52A. Resistor value outlet 56 corresponding to an output terminal of the resistor is placed outside the circular area formed of the horseshoe shape, and led out to the outside via third terminal 55C on tail 52A. Resistor value outlet 56 is connected to lower substrate 53. Between first end 54A and second end 54B, there is a space where no resistor element 54 is formed. This space is placed at an angle such that this space does not need to work as the multi-directional (in this case, eight directions) operating section.

Pad 51 discussed above is similar to a structure of a variable resistor. An operation of pad 51 is demonstrated hereinafter. A predetermined voltage is applied to resistor element 54 at between first end 54A and second end 54B, via first terminal 55A and second terminal 55B, and a user operates the top of upper substrate 52, where resistor element 54 is formed, by putting his/her finger on the top of operating button 61. Then the place operated by the user is partially bowed downward, so that the corresponding place of resistor element 54 is brought into contact with lower substrate 53. An output voltage thus can be read from lower substrate 53 via resistor value outlet 56 and third terminal 55C, thereby identifying the operating position in response to a resistance division ratio. First end 54A and second end 54B correspond to applying terminals of resistor element 54, and resistor value outlet 56 corresponds to an output terminal of resistor element 54.

Multi-directional operating section 20 comprises the following elements:
- push-switch 41;
- disk-like operating button 61 provided over push-switch 41; and
- pad 51 provided between push-switch 41 and operating button 61.

The center of operating button 61 is aligned over the center of push switch 41. Round section 61A of operating button 61 protrudes from a round hole of second enclosure 25 as shown in FIGS. 1 and 3 and is exposed on operator panel 25a. Operating button 61 is prevented from coming out upward by upper case 25C of second enclosure 25 as well as from rotating by some regulating device, on the other hand, it is mounted movable up and down as well as tilted with respect to second enclosure 25.

Operating button 61 has eight ball-like projections 62A-62H protruding downward and arranged at 45° interval on its underside. A supposed ring running through eight projections 62A-62H has the same diameter as that of resistor element 54. The front, back, left and right directions of second enclosure 25 are assigned to ball-like projections 62D, 62H, 62B and 62F respectively. On top of that, operating button 61 is mounted above upper substrate 52 such that respective projections 62A-62H correspond to the place where resistor element 54 is formed. The foregoing structure allows resistor element 54 to touch lower substrate 53 through up-down moving of projections 62A-62H.

An output from push-switch 41 and pad 51 of multi-directional operating section 20 is input to digital port 81A and analog-digital converting port 81B of controller 81 which controls given functions. Controller 81 is accommodated in second enclosure 25 and can also carry out various functions. In this embodiment, necessary parts for operating multi-directional operating section 20 are illustrated as a connected status, and other functions and their connected status are omitted here. Controller 81 can control a content to be displayed on display 3 based on signals supplied from multi-directional operating section 20 to ports 81A and 81B.

Figure 7:
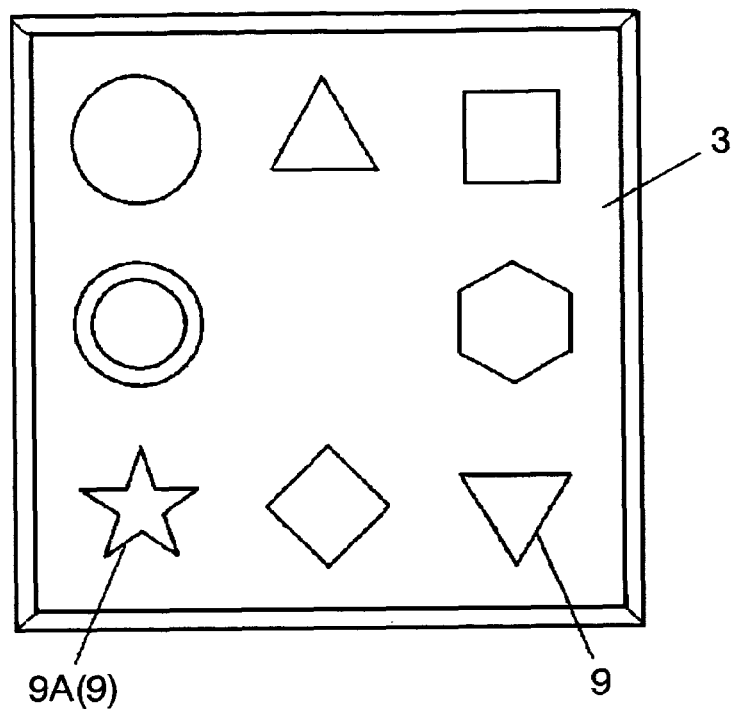
FIG. 7 schematically shows respective choices displayed as icons on the display in accordance with an embodiment of the present invention.
Figure 8:
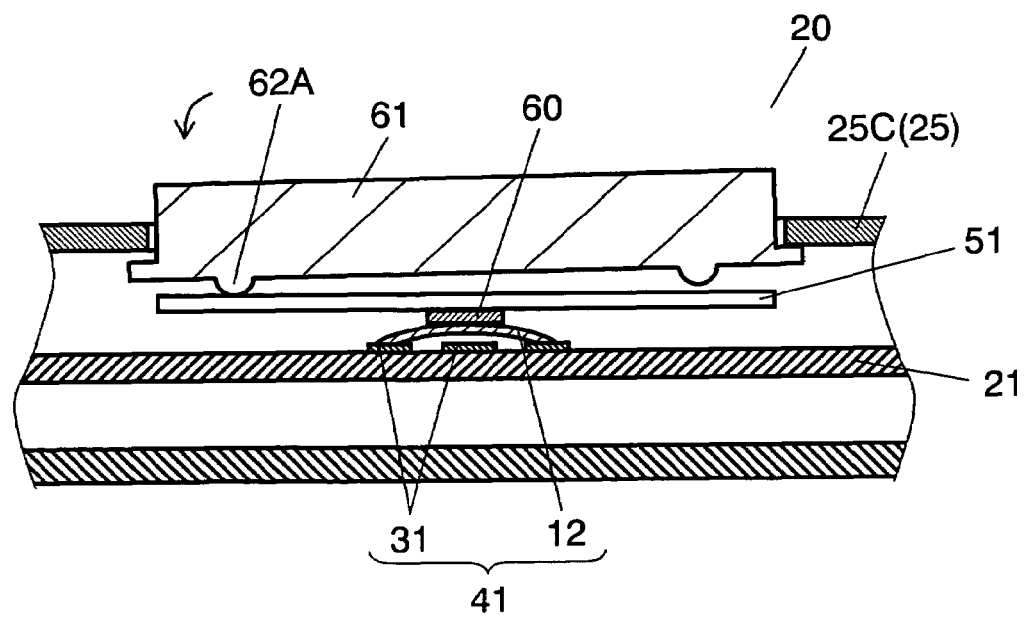
FIG. 8 shows a sectional view illustrating a multi-directional operating section in operation in accordance with an embodiment of the present invention.
Figure 13:
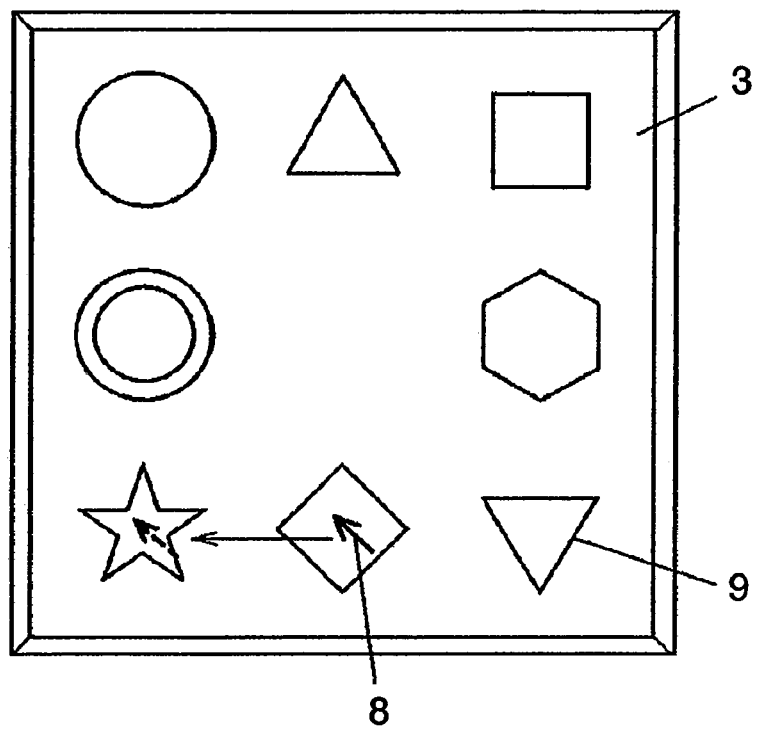
FIG. 13 schematically illustrates respective choices displayed as icons on the display of the general cellular phone.
Figure 13:
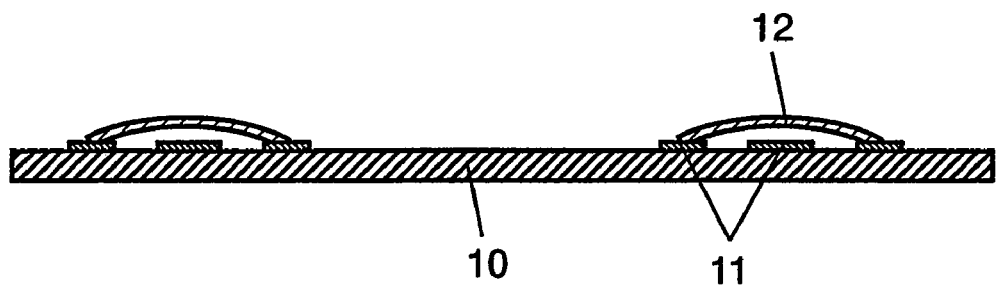

An operation of cellular phone 100 including multi-directional operating section 20 is demonstrated hereinafter. Display 3 shows plural icons 9 arranged in a given format. In this embodiment, the same format as described in the prior art is used, namely, eight icons 9 are arranged equidistantly forming a square on display 3. As shown in FIG. 7, display 3 of cellular phone 100 in accordance with this embodiment does not show a pointer which indicates a choice selected. This is a difference from the conventional cellular phone shown in FIG. 13.

Starting from the status shown in FIG. 7, a user touches operating button 61 at a position corresponding to a desirable icon 9 in terms of an angular direction by putting his/her finger on the position. For instance, assume that the star mark shown at lower left of display 3 shown in FIG. 7 is a desirable icon 9A, then the user put his/her finger on button 61 at the left lower end, i.e. angular direction of 45° tilted from the vertical center line. This touching operation somewhat slants button 61 along that direction, then ball-like projection 62A, provided on the underside of button 61 at the place corresponding to the angular direction, is depressed. Depressed projection 62A bows upper substrate 52 in part, thereby resistor element 54 touches lower substrate 53 in part at the place corresponding to the position of ball-like projection 62A. At this time, since a voltage is applied to resistor element 54, an output voltage value is input to analog-digital converting port 81B via resistor value outlet 56 and third terminal 55C. The output voltage value is recognized by controller 81, so that the angular direction operated can be identified. At the touching operation, a little depressing force is applied to push-switch 41 via pressing protrusion 60; however, push-switch 40 maintains the OFF status as long as the force applied does not exceed a given value.

Figure 9:
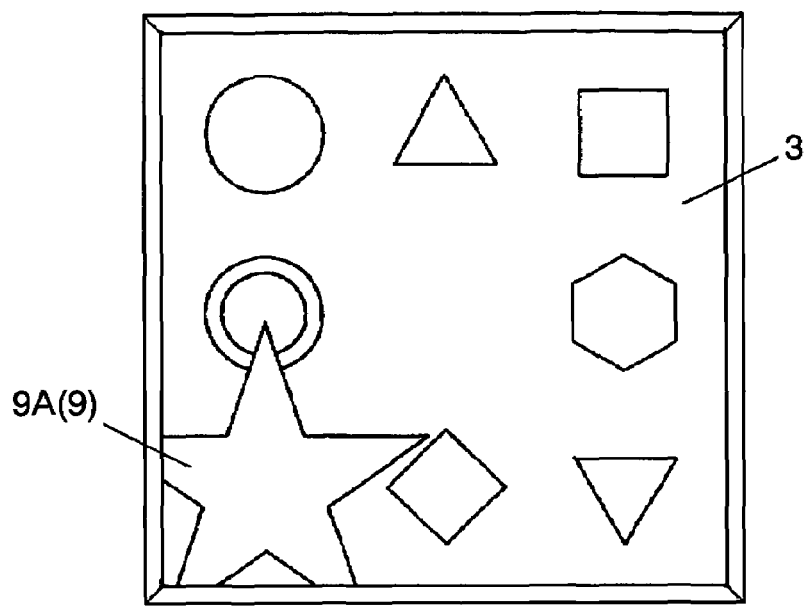
FIG. 9 schematically illustrates a desirable icon among the icons in the display is preliminarily displayed.

Then the angular direction operated on button 61 is identified, and based on the identified result, controller 81 changes desirable icon 9A to a preliminary display showing the function assigned to icon 9A. FIG. 9 shows an enlarged and highlighted icon as an example of the preliminary display. When the touching operation is halted and supply of signals from pad 51 is stopped, this preliminary display is restored by controller 81 to the original display as shown in FIG. 7.

As discussed above, cellular phone 100 of the present invention is firstly operated by putting a finger on operating button 61, namely, a touching operation, which is advantageously simple comparing with a conventional depressing operation. On top of that, a first action in response to the touching operation on button 61 allows showing the preliminary display such as an enlarged and highlighted display, and halting the touching operation allows canceling the preliminary display, so that a content of an icon can be visualized for confirmation without changing the function to another one. This is an excellent operability.

Figure 10:
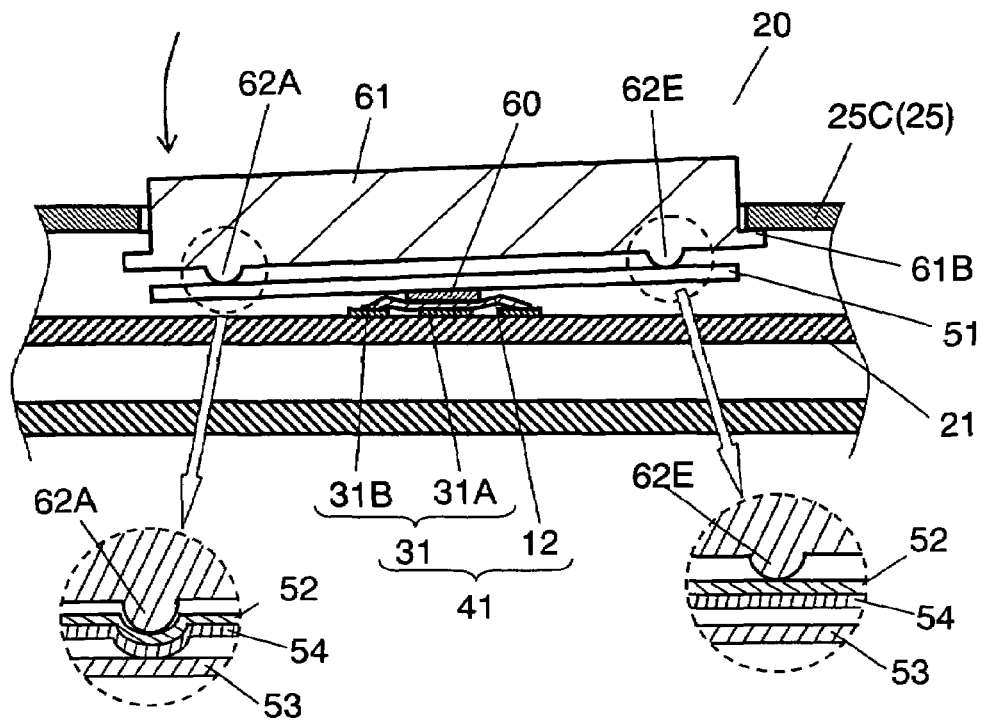
FIG. 10 shows a sectional view illustrating a multi-directional operating section in operation in accordance with an embodiment of the present invention.
Figure 11:
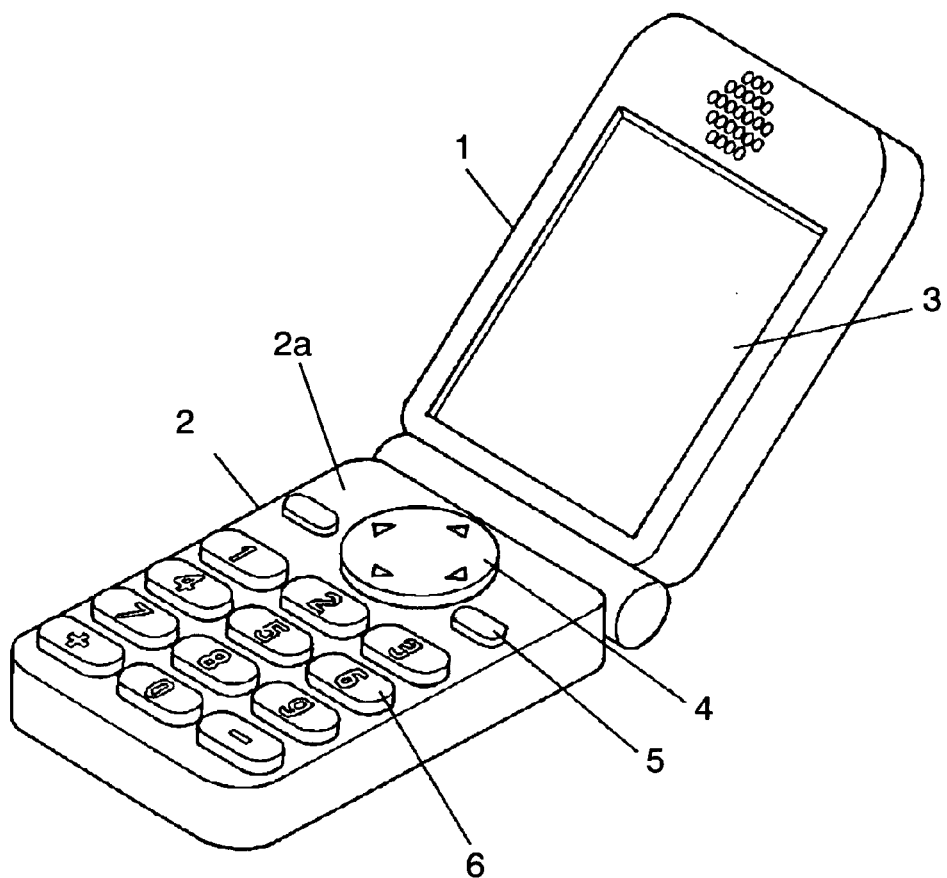
FIG. 11 shows a perspective appearance of a general cellular phone.
Figure 12:
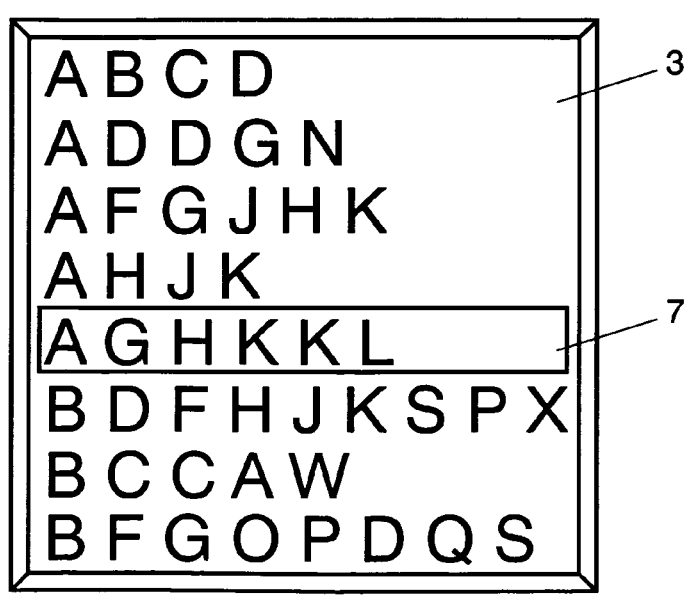
FIG. 12 schematically illustrates choices arranged in a matrix form displayed on the display of the general cellular phone.

Next, an operation by a user how to determine a desirable icon enlarged and highlighted on display 3 is demonstrated hereinafter. The user touches operating button 61 at a certain place, then further presses down the same place, thereby determining desirable icon 9A. As shown in FIG. 10, the press down of operating button 61 allows button 61 to further slant because an upper end of flange 61B on the other side of the depressed place works as a fulcrum. At the same time, pad 51 is pushed by ball-like projection 62A, so that pad 51 as a whole slants while the partial contact, caused by bowing upper substrate 52, between resistor element 54 and lower substrate 53 is maintained.

An instance shown in FIG. 10 tells that slanting operating button 61 prompts ball-like projection 62A on the left to bow pad 51. Bowing of pad 51 distorts both of upper substrate 52 and resistor element 54 formed on substrate 52, and parts of resistor element 54 touches lower substrate 53. In this status, press-down of button 61 slants pad 51 as a whole, so that ball-like projection 62E on the right in FIG. 10 touches the surface of pad 51; however, projection 62E does not distort pad 51. Thus resistor element 54 formed on upper substrate 52 is not distorted or does not touch lower substrate 53. In other words, during the press-down of button 61, resistor element 54 contacts lower substrate 53 only at the position of projection 62A.

The press-down of operating button 61 prompts lower substrate 53 to depress push-switch 41 via pressing protrusion 60, and push-switch 41 is turned to ON status with the moderate tactile feeling maintained. Pad 51 thus can move up and down as well as slant with respect to operator panel 25a.

Controller 81 receives signals from push-switch 41, then executes a second action, which includes executing of a function assigned to desirable icon 9A and shifting of a displayed content on display 3 from the present menu to another one on a lower level.

Then removal of the finger from operating button 61 prompts domed movable contact 12 of push-switch 41 to restore itself to the original upward bowing shape, i.e. OFF status, and push back pad 51, so that pad 51 and operating button 61 restore their positions as they were before the operation. Other operations done at the other places result in a similar advantage to what is discussed above.

A touch operation to button 61 prompts controller 81 to enlarge and highlight icon 9 for a preliminary display, where icon 9 corresponds to the place under the touch operation. The same place under the touch operation is further pressed down, which pushes button 61 and pad 51 while the slanted statuses of button 61 and pad 51 are maintained. As discussed above, a push-down of single push-switch 41 prompts controller 81 to execute the function assigned to the icon or determine the function.

Cellular phone 100 of the present invention has only one push-switch 41 as discussed above, and this push-switch 41 is depressed by pad 51, which can be slanted, regardless of an operating position, thereby executing a switching operation. This structure allows multi-directional operating section 20 to reduce the number of components. Basically multi-directional operating section 20 has thin pad 51 as an additional item, so that it is easy to maintain a slim body of cellular phone 100. A touch operation to pad 51 allows a preliminary display of a desirable icon, thereby achieving a quick operation, so that the usability is improved because of the better operability.

In this embodiment, the slanting of pad 51 is described as follows: pad 51 is slanted using an upper end of operating button 61 on the other side of the depressed place as a fulcrum, thereby depressing push-switch 41. Instead of this method, the following method of slanting pad 51 can be used: an operated part of pad 51 touches on circuit board 21 firstly, then the other side of the operated part lowers using the touched position as a fulcrum for depressing push-switch 41.

Pad 51 is not limited to the one discussed above, but it can be an electrostatic pad. The angular directions to be detected are not limited to eight directions, but any angular directions can be used as long as they can be detected.

The projections provided to the underside of operating button 61 is not limited to the ball-like shape, and a continuous annular protrusion can be used instead of plural ball-like projections arranged in an annular shape.

Push-switch 41 can use another structure, and a thin push-switch completed as an electronic component can be mounted on the circuit board 21.

In this embodiment, cellular phone 100 is taken as an example of the electronic device; however, recently various electronic devices such as digital still cameras has been increasingly equipped with this function, namely, menus are displayed on the display, and a desirable choice is selected and executed. The structure of the operating section and the control method of the present invention can be used in operating sections of various electronic devices other than the cellular phones.

One feature of the electronic device of the present invention is this: a given function preliminary announced through a first action by a controller is determined or executed through a second action. The first action is, e.g. selecting an icon from among the icons displayed on the display through a touching operation onto a operating button. The second action is, e.g. the icon stays in a selected status, then the operating button is further depressed for turning a switch ON, thereby executing a desirable function assigned to the selected icon, or displaying a lower level menu related to the selected icon. The present invention allows executing the first and second actions by sequential operations onto the single operating button, so that the electronic device excellent in usability is obtainable.

The number of menus included in the first action can be arbitrarily set depending on a combination of the pad having a resistor element with the operating button having plural projections on the underside. The first action is carried out through simply slanting the operating button, so that a jump from a menu to another one can be done with ease.

Another feature of the electronic device of the present invention is that the electronic device is equipped with a display. A preliminary status can be displayed as per an instruction supplied from the controller to the display, so that a user can operate the device while watching the information displayed.

The preliminary display described as the first action is not limited to the enlarged and highlighted display taken as an example in this embodiment. For instance, an announcement other than the display, such as a notice by sound or vibration, can be used. Use of sound or vibration allows realizing this multi-directional operating section of the present invention in electronic devices which do not have the display function. The first action workable by a simple operation can be used for another function than the preliminary announcement.

As discussed above, the electronic device of the present invention has a single push-switch under a pad which can detect an operating coordinate position. A touch on the operating button slants the pad, and a further press-down of the button allows switching the push-switch while the pad stays slanted in the pressing direction regardless of the operating position onto the pad. The electronic device includes the foregoing operating section. This structure advantageously allows reducing the number of components and being excellent in operability, so that the operating section can be useful in various electronic devices such as audio visual devices and office automation devices.

What is claimed is:

1. An electronic device comprising:
    an operating button;
    a pad disposed under the operating button for detecting a plurality of angular directions of the operating button slanted by an operation, wherein the pad is slanted by the operating button slanted by the operation;
    a single push-switch disposed under the pad; and
    a controller receiving a signal supplied from the pad and the push-switch respectively, and at least recognizing the signals supplied,
    wherein the controller executes a first action with respect to one of the functions assigned to each one of the angular directions of the operating button slanted, and while the operation button is kept slanted, the controller recognizes a press-down operation onto the push-switch for executing a second action with respect to one of the functions assigned to each one of the angular directions.

2. The electronic device of claim 1, wherein the first action preliminary announces one of the functions assigned to each one of the angular directions.

3. The electronic device of claim 2, wherein the second action determines or executes the function preliminary announced by the first action.

4. The electronic device of claim 1 further comprising a display, wherein the controller displays a preliminary announcement on the display.

5. The electronic device of claim 1, which allows a multi-directional operation,
    wherein the pad includes a resistor element which can detect an angular direction of the operating button slanted,
    wherein the push-switch is turned on or off by the up and down movement of the operating button, and
    wherein a reception of the signal supplied from the pad prompts the controller to execute a first action, and during the execution of the first action, a reception of a signal of the push-switch prompts the controller to execute a second action.

6. The electronic device of claim 5, wherein the pad includes:
    a disk-like lower substrate;
    an upper substrate of which underside confronts the lower substrate;
    a ring-like resistor element disposed on an underside of the upper substrate;
    a pair of applying terminals for applying a voltage to the resistor element; and
    an output terminal for outputting a voltage supplied from the lower substrate.

7. The electronic device of claim 5, wherein the operating button has a plurality of projections circularly arranged on an underside of the button,
    wherein slanting of the operating button prompts one of the projections to push the pad, and an output voltage corresponding to an angular direction along the push is sent to the controller, wherein the controller receives the output voltage and executes the first action.

8. The electronic device of claim 5 further comprising a display,
    wherein the controller displays a result of the first action on the display; and
    wherein a user confirms the first action, then executes the second action by moving the operating button up and down.

9. The electronic device of claim 5, wherein the push-switch has a domed movable contact and a protrusion formed between the movable contact and the pad.

10. The electronic device of claim 5, wherein the first action selects a specified icon from among a plurality of icons displayed; and
    wherein the second action carries out executing a function assigned to the selected icon or displaying a lower level menu related to the selected icon.

11. The electronic device of claim 1, further comprising an enclosure that houses the pad and the push-switch,
    wherein the operating button has a flange protruding under the enclosure, and
    wherein the operating button pushes the push-switch utilizing the flange and the enclosure as a fulcrum, when the operating button is kept slanted.

12. A multi-directional operating switch comprising:
    an operating button provided with a flange;
    a pad disposed under the operating button for detecting an angular direction of the operating button slanted by an operation;
    a single push-switch disposed under the pad; and
    an enclosure for housing the flange of the operating button, the pad and the push-switch,
    wherein the multi-directional operating switch detects the angular direction by a first slanting operation, the operating button pushes the push-switch utilizing the flange and the enclosure as a fulcrum, when the operating button is kept slanted.

13. The multi-directional operating switch of claim 12 wherein the pad comprises a resistor element for detecting the angular direction.

* * * * *